UNITED STATES PATENT OFFICE.

JOHN B. EKELEY AND WILLIAM B. STODDARD, OF BOULDER, COLORADO.

PROCESS FOR OBTAINING PURE TUNGSTATES.

1,399,705. Specification of Letters Patent. Patented Dec. 6, 1921.

No Drawing. Application filed August 7, 1917. Serial No. 184,831.

*To all whom it may concern:*

Be it known that we, JOHN B. EKELEY and WILLIAM B. STODDARD, of Boulder, in the county of Boulder and in the State of Colorado, have invented a certain new and useful Improvement in Processes for Obtaining Pure Tungstates, and do hereby declare that the following is a full, clear, and exact description thereof.

Our invention relates particularly to the treatment of ores containing tungsten so as to separate impurities from the same and to obtain the tungsten in the form of a pure salt of tungstic acid, which is free from the undesirable impurities.

The object of our invention is to obtain pure tungstates by the treatment of various ores containing the same, so as to separate out impurities contained in the ores and so as to obtain pure tungstates therefrom free from the undesirable impurities.

A further object is to remove phosphorus and arsenic from solutions containing tungstates.

Further objects of our invention will appear from a detailed description thereof contained hereinafter.

The present invention is an improvement upon the invention set forth in our application upon process of obtaining tungstates, Serial No. 106,358, filed June 28th, 1916.

In general, our process comprises preparing a solution of a tungstate and treating said solution to remove an element of the phosphorus group which may be present by adding a salt of a metal adapted to form an insoluble salt with an acid containing said element. A substantial purification of the tungstate solution is secured if the process is stopped at this point, but preferably a more complete purification is obtained by making the solution alkaline and adding an ammonium compound so that ammonium hydroxid will be present in the solution; upon removing the precipitate a tungstate solution is obtained which is almost entirely free from phosphorus and arsenic.

While our invention is capable of being carried out in many different ways, for the purpose of illustration we have described only one example of the same herein.

For example an ore containing tungsten as for example wolframite, hubnerite, ferberite, scheelite, tungstite, etc., is crushed, sampled, and ground in any suitable manner, by any one of the well-known methods, to a suitable degree of fineness. The degree of fineness may vary to some extent with the nature of the ore, as for example, the facility with which it subjects itself to the succeeding treatments in the process. The ore is then mixed with sodium chlorid, sodium carbonate, and if found desirable, some silica. An amount of sodium chlorid is added, preferably from two-fifths to the same in weight as the weight of the ore. An amount of the sodium carbonate is added sufficient to combine with all of the tungstic acid and leave in addition an excess of the sodium carbonate. Sufficient silica is ordinarily added to combine with the excess of sodium carbonate so as to produce an insoluble silicate preferably containing sodium oxid and silicon dioxid in the proportions of one to four. Some ores, however, do not require the addition of any silica for this purpose, and in working with such ores the silica is omitted. If desired, sodium nitrate or sodium chlorate may be added to the mixture to provide oxidizing agents in the bath when fused. Instead of sodium chlorid, we may use sodium fluorid or calcium chlorid or fluorid. The charge is then fused in a suitable furnace. After the bath of fused materials has been allowed to cool, it will be found that the solid materials will have become separated into a water soluble portion and a water insoluble portion, the tungstic acid being contained in the form of a sodium tungstate in the water soluble portion. The solid mass is crushed and then extracted with water, for example, 4000 pounds of melt to 8000 pounds of water and is then filtered. The filtrate contains a clear solution of sodium tungstate, containing impurities, including small amounts of compounds containing phosphorus and arsenic. To the solution thus obtained an oxidizing agent is preferably added, as for example sodium hypochlorite in a quantity depending upon the amount of oxidizable impurities, as for example, Sodium hypochlorite___ 14 pounds.

Thereafter, a magnesium salt, which may be for example either magnesium sulfate or magnesium chlorid, is added to the solution in a quantity sufficient to combine with the phosphorus and arsenic acid as for example:

Magnesium chlorid___ 105 pounds.

or instead of a salt of magnesium I may add a salt of an alkaline earth metal; both the magnesium salt and the alkaline earth metal salt will be hereinafter referred to generically as a salt of an alkaline earth metal.

This results in the production of magnesium hydrogen phosphate $MgHPO_4$ which is rather insoluble in water. The solution is thoroughly boiled for about three hours and is allowed to cool to about 60° C. This results in the production of normal magnesium phosphate $Mg_3(PO_4)_2$. The solution is thereupon rendered slightly ammoniacal by the addition of 60 pounds of commercial ammonia, and if desired, by the further addition of 10 pounds of ammonium chlorid, the amounts added being sufficient, however, to combine with the remaining phosphates and arsenates carried in solution, and is then agitated in any suitable manner. As a result ammonium magnesium phosphate $NH_4MgPO_4$ is formed as a precipitate. The solution is then allowed to stand for several hours and is filtered from the precipitate. Arsenic compounds similar to the phosphorus compounds mentioned are precipitated and separated at the same time with the phosphorus compounds. The resulting solution contains substantially pure sodium tungstate, substantially free from any traces of phorphorus and arsenic. If desired, the tungstate may be recovered as calcium tungstate by adding a quantity of calcium chlorid or calcium hydroxid in excess of the amount required to replace the sodium in the sodium tungstate.

While we have described our invention above in detail, we wish it to be understood that many changes may be made therein without departing from the spirit of our invention.

We claim:

1. The process which comprises treating a solution of a tungstate to remove an element of the phosphorus group by adding a salt of an alkaline earth metal adapted to form an insoluble salt with an acid containing said element.

2. The process which comprises treating a solution of a tungstate to remove an element of the phosphorus group by adding a salt of magnesium adapted to form an insoluble salt with an acid containing said element.

3. The process which comprises treating a solution of a tungstate to remove phosphorus and arsenic by adding a salt of an alkaline earth metal adapted to form an insoluble salt with phosphoric acid and with arsenic acid.

4. The process which comprises treating a solution of a tungstate to remove an element of the phosphorus group by adding a salt of an alkaline earth metal adapted to form an insoluble salt with an acid containing said element, then adding ammonium hydroxid, and removing the precipitate.

5. The process which comprises treating a solution of a tungstate to remove an element of the phosphorus group by adding a salt of magnesium adapted to form an insoluble salt with an acid containing said element, then adding ammonium hydroxid, and removing the precipitate.

6. The process which comprises treating a solution of a tungstate to remove an element of the phosphorus group by adding an oxidizing agent, then by adding a salt of an alkaline earth metal adapted to form an insoluble salt with an acid containing said element.

7. The process which comprises treating a solution of a tungstate to remove an element of the phosphorus group by adding an oxidizing agent, then adding a salt of magnesium adapted to form an insoluble salt with an acid containing said element.

8. The process which comprises treating a solution of a tungstate to remove an element of the phosphorus group by adding an oxidizing agent, then adding a salt of an alkaline earth metal adapted to form an insoluble salt with an acid containing said element, then adding ammonium hydroxid, and removing the precipitate.

9. The process which comprises treating a solution of a tungstate to remove an element of the phosphorus group by adding an oxidizing agent, then adding a salt of magnesium adapted to form an insoluble salt with an acid containing said element, then adding ammonium hydroxid, and removing the precipitate.

In testimony that we claim the foregoing we have hereunto set our hands.

JOHN B. EKELEY.
WILLIAM B. STODDARD.